United States Patent [19]

Sheesley et al.

[11] 3,927,573
[45] Dec. 23, 1975

[54] ARTICULATED ACTUATOR

[75] Inventors: John M. Sheesley, Houston; Ronald A. Gulick, Sugarland, both of Tex.

[73] Assignee: Research Engineering Co., Houston, Tex.

[22] Filed: June 24, 1974

[21] Appl. No.: 482,377

[52] U.S. Cl. .................................................. 74/50
[51] Int. Cl.² ................................. F16H 21/18
[58] Field of Search ............... 74/49, 50, 89.15, 526

[56] References Cited
UNITED STATES PATENTS

| | | | |
|---|---|---|---|
| 72,608 | 12/1867 | Currey | 74/49 |
| 3,063,298 | 11/1962 | Elliott | 74/89.15 |
| 3,757,611 | 9/1973 | Buck | 74/526 |

*Primary Examiner*—Samuel Scott
*Assistant Examiner*—Wesley S. Ratliff, Jr.
*Attorney, Agent, or Firm*—Robert W. B. Dickerson

[57] ABSTRACT

An actuator having a means for transmitting force from a reciprocating piston to an oscillatable member, which transmitting means includes a pivotal linkage; also includes an articulated housing for said oscillatable member and transmitting means.

5 Claims, 5 Drawing Figures

ARTICULATED ACTUATOR

BACKGROUND OF THE INVENTION

Numerous industrial applications exist whereby an actuating mechanism is used to cause the operation of a further member. For example, valves, which in turn may regulate fluid flow through a conduit, must be opened and closed, as by a valve actuator. Such actuators may be hydraulically, pneumatically, electrically, spring or manually powered. One development of the prior art, such as exemplified by U.S. Pat. No. 3,704,986, involved the use of a linearly movable piston, to cause rotation or oscillation of a torque member, or yoke. This latter member, usually by virtue of a pin connection, caused similar rotation of a valve stem to open or close the valve. During the development of this type of actuator, various problems have arisen. For example, one particular utilization may suggest an optimum torque output at one point of the torque curve, which the standard yoke is unable to provide. Further, the necessary continued attention to economy directs a continued search for a more efficient means of fabricating the actuator assembly. It was to these merged two-fold problem areas that these inventors directed their attention.

SUMMARY OF THE INVENTION

A housing portion is linked to a power cylinder, which cylinder includes a power driven piston. Such linearly-movable piston is linked to a rotatable torque member by virtue of a pivotal linkage. This linkage provides a variant to the torque curve which would result from the piston rod being pivotally connected directly to the yoke. Additionally, the central housing, rather than being cast, is fabricated from a plurality of individual components, which may be welded, bolted, or otherwise assembled, in a sturdier and economical manner.

DESCRIPTION OF A PREFERRED EMBODIMENT

Figure 1:
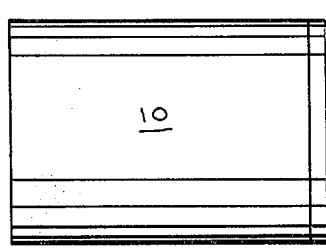
FIG. 1 is a plan view of the housing and power cylinder.

FIG. 1 generally depicts a power cylinder 10, linked to a central housing 20. Of course there might be a further cylinder connected to the opposite side of the housing, such as another power cylinder or a spring return cylinder. However for simplicity purposes, the illustration of a single cylinder will suffice.

Cylinder 10 would include a piston (not illustrated) slidable therein. Attached to such a piston would be piston rod 21, which reciprocatingly extends outside the cylinder 10. A source of power, such as fluid under pressure, would cause reciprocation of the piston and attached piston rod 21. The means for accomplishing the above are old. In any case, reciprocation of rod 21 would be along the line of the arrows of FIG. 2.

Figure 2:
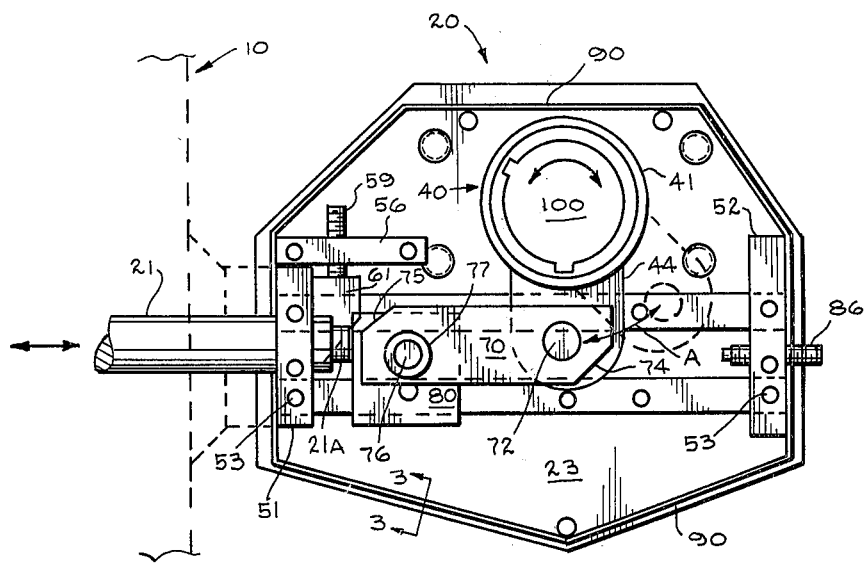
FIG. 2 is an enlarged plan, similar to FIG. 1, but with the housing cover removed, and the cylinder only partially illustrated.
Figure 3:
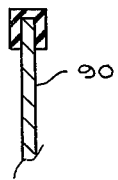
FIG. 3 is a section taken along lines 3—3 of FIG. 2.
Figure 4:
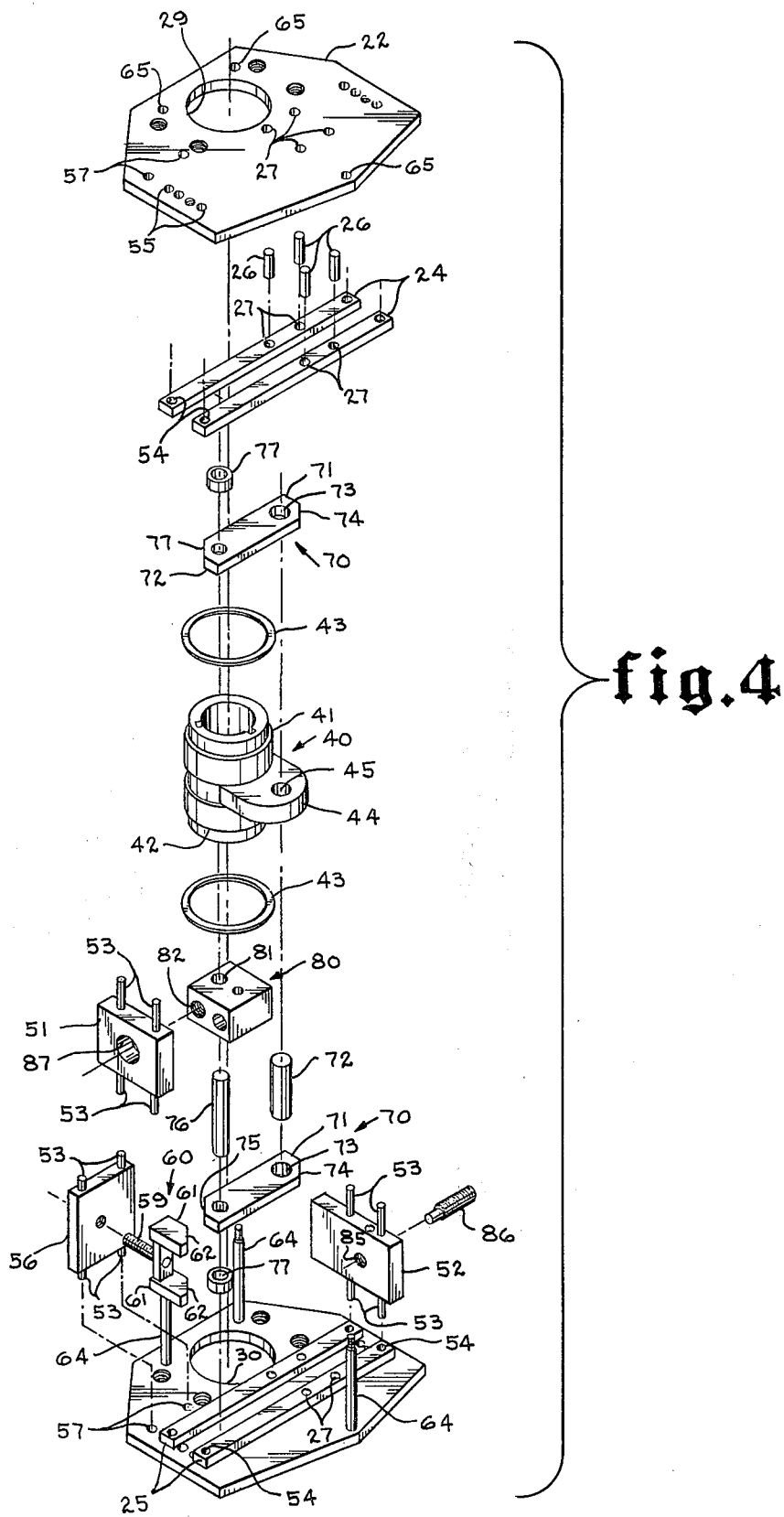
FIG. 4 is an exploded perspective of the actuator housing, hub, piston and linkage.

Consider now the housing, and internal parts associated therewith, of FIGS. 2 and 4. Generally planar, upper and lower cover plates 22 and 23 are provided. The plates are correlative in configuration. Each plate has fixed to it a pair of track-forming rails, such rails being illustrated by the numerals 24 and 25. Pins or bolts 26 may partially secure the rails to their respective cover plates, through aligned apertures 27.

Each one of plates 22, 23 possesses a hub-receiving aperture 29, 30. The surface around such openings serve as bearings for shoulders 41 and 42 of torque member or hub 40. Bushings or gaskets 43 may be provided therebetween. Centrally positioned, axially, between shoulders 41, 42, is depending lug 44, which lug is apertured at 45.

Plates 22, 23 are spaced from and fixed to each other by pin-carrying blocks 51 and 52. Each of said blocks carries a pair of upper and lower pin extensions 53. Such extensions extend through aligned apertures 54, 55 in the respective rails and housing plates. Said plates are further spaced from and fixed to each other by block 56, which also includes upper and lower pairs of pin extensions 53. These latter pins extend through apertures 57 in the upper and lower cover plates. Note that block 56, when assembled, is set in a position approximately perpendicular to block 51, 52. Block 56 also includes a threaded aperture 58, for adjustably receiving one end of threaded rod, bolt or screw 59. The other end of member 59 has fixed thereto the cross piece of yoke 60. Said yoke includes a pair of ears 61, each one of which includes a beveled portion 62.

Other threaded connectors, such as rods 64, may fixedly secure plates 22, 23 together, such as by extending through apertures 65.

End 71 of links 70 are pivotally joined to lug 44, by virtue of pin 72 being positioned within link apertures 73, and aligned aperture 45 of lug 44. Such links, on assembly, are positioned on opposite sides of lug 44, and may be separated therefrom by spacers if desired. The links have a beveled portion 74 at end 71 and a further beveled portion 75 opposite portion 74, at the other end 72.

The other end 72 of said links 70 is also apertured, for pivotally receiving pin 76. Intermediate said other ends of said links is traveling block 80. This block is also apertured, at 81, to receive pin 76. The opposed extremities of pin 76 are fitted with rollers 77. Such rollers, on assembly, rollably and/or slidably engage the facing, inner walls of rails 24, 25. If desired, slide blocks may be substituted for such rollers. Traveling block 80 includes threaded opening 82 to receive the matingly threaded end 21A of piston rod 21. A similar further aperture through the traveling block is depicted, for the receipt of a spring return shaft, in the event a spring return mechanism is provided.

Block 52, like block 56, includes a threaded aperture, namely 85, to adjustably receive stop member 86. Block 51 is centrally apertured, at 87 for receipt of reciprocating piston rod 21.

A substantially annular skirt portion 90 circumscribes substantially all of the internal operative mechanism of housing 20. The skirt may be affixed to top and bottom cover plates 22, 23 in a number of convenient manners. For example, the plates may be grooved to receive the skirt edges, or one or both of the skirt edges may be fitted within a seal slot and the seal affixed to the adjacent cover plate. In any case, the skirt may be fabricated from relatively light material and may protect the housing interior to whatever degree desired.

Figure 5:
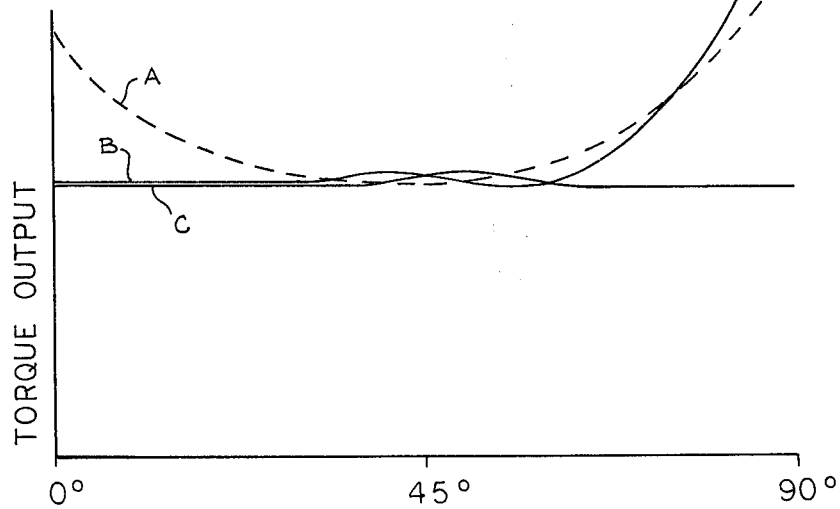
FIG. 5 represents a series of torque curves, including that produced by this invention.

Consider now the advantageous operation of the actuator of this invention. A valve stem 100 would be keyed to the interior of hub 40, for rotation therewith. Assume that counter clockwise motion in FIG. 2 results in valve opening, and is desired. An outside source of power to cylinder 10 would cause its piston, along with piston rod 21, to move to the right in FIG. 1. As rod 21 moves linearly, it, by virtue of threaded attachment to traveling block 80, moves said block linearly to the right. Further, block 80 carries vertical pin 76, and said pin carries rollers 77, which rollers ride between and are guided linearly by rails 24, 25 in facing sides of cover plates 22, 23. Also links 70 are pivotally fixed at one end to pin 76, on opposite sides of block 80, and move therewith. The other ends of links 70 are pivoted to lug 44 of valve-stem-carrying hub 40, by virtue of pin connection 72. Thus, during such movement, said link ends 71 approximately follow the path of arrows A, in FIG. 2, rotate hub 40, thereby opening the affixed valve. As the piston reaches the end of its intended stroke, traveling block 80 will abut against the end of adjustable stop member 86. Obviously, the exact length of the stroke may be adjusted. Movement in the opposite direction is also limited. Yoke 60 may be adjustable positioned relative to fixed block 56, by virtue of threaded member 59. Ears 61 of yoke 60 have their beveled portions 62 engageable with beveled portions 75 of links 70. Thus, the exact point at which yoke 60 acts as a stop for the return mechanism is subject to manipulation. By virtue of the geometry of the actuator, and particularly of the piston rod, link, hub connection, the torque output varies from a standard scotch yoke. It should be noted that when lug 44 approaches being parallel to piston rod 21, i.e. links 70 approach being perpendicular to piston rod 21, the torque output would approach infinity. By varying the actual angle traversed, particularly by varying stops 60 or 86, a particularly desirable portion of the torque curve may be achieved. FIG. 5 illustrates this, assuming a maximum rotation of 90 degrees by hub 40. The output of a standard scotch yoke is illustrated by "A" on the chart of FIG. 5. Curve "B" indicates generally the output of this actuator through substantially 90° travel. Curve "C" indicates output wherein piston movement to the right of FIG. 2 is limited so that levers 70 do not approach being perpendicular to piston rod 21.

In addition to the torque-affecting attributes of this invention, its rigidity and economy of fabrication represent substantial advances over the prior art. Heretofore, most such housings have been unitarily cast. One problem encountered has involved the necessity for material uniformity throughout. Further, an examination of these inventors' drawings reveals that an excess of material is used in casting the standard housing. By using only essentially 3 supporting walls, namely blocks 51, 52 and 56, greatly increased strength can be accomplished without substantial additional costs.

In summation, advances have been illustrated, both in the area of modifying the torque output in a desirable manner, and in the area of strengthening the housing structure without a sacrifice in economy. Although only single embodiment has been described, it should be obvious that numerous modifications would be possible by one skilled in the art without departing from the spirit of the invention, the scope of which is limited only by the following appended claims.

We claim:

1. In an actuator having a housing, a rotatable yoke member, mounted for rotation in said housing, a reciprocatable piston rod member mounted for reciprocation on said housing, and means for connecting said reciprocatable member to said rotatable member, the improvement comprising:

said housing including upper and lower pairs of track members;

said connecting means includes; traveling block member fixed to said piston rod member, at least one link pivotally connected to said traveling block member and to said rotatable yoke member, said pivotal connection to said traveling block includes a pin passing through said traveling block and said link, said pin including at each end thereof a low friction member, said low friction members each being of such size and shape as to be adapted to slide between and be guided by said pairs of track members on said housing.

2. The actuator of claim 1, and including means for limiting the linear moving, in opposite directions, of said reciprocatable piston rod member, said limiting means including the following;

a. at least one stop member adjustably positionable along a line intersecting the axis of said piston rod member, and such stop member including a beveled edge forming an angled surface; and b. said link including a beveled edge forming an angled surface for abuttably engaging said angled surface of said stop member.

3. In an actuator having a rotatable yoke member, a reciprocatable piston rod member, and means for connecting said members, the improvement comprising:

a modular housing, for mounting said yoke and piston rod members therein, said housing comprised of;

upper and lower cover plates, means in both said cover plates for rotatably supporting said rotatable yoke member, first and second combination spacer and support blocks, on opposite sides of said housing, each block having pin connectors for removably positioning said blocks between and connecting said cover plates, and at least one of said blocks including means for slidably accommodating said piston rod member, and further block member, transverse of said first and second blocks, said further block member including means for limiting reciprocating movement of said piston and member.

4. The actuator of claim 3 and including a skirt portion, intermediate said plates, encircling substantially all of the interior of said housing.

5. The actuator of claim 3, wherein said limiting means includes the following:

a stop member adjustably fixed to said further block and movable transverse to the axis of said piston and member, said stop member including a beveled portion, and wherein said connecting means includes a beveled portion abuttably engageable with said stop member's beveled portion.

* * * * *